(12) United States Patent
Kornmann et al.

(10) Patent No.: US 9,164,651 B2
(45) Date of Patent: Oct. 20, 2015

(54) MANAGEMENT OF GEOGRAPHIC DATA LAYERS IN A GEOGRAPHIC INFORMATION SYSTEM

(71) Applicant: Google Inc., Mountain View, CA (US)

(72) Inventors: David Kornmann, Tucson, AZ (US); Julien Charles Mercay, Belmont, CA (US)

(73) Assignee: Google Inc., Mountain View, CA (US)

( * ) Notice: Subject to any disclaimer, the term of this patent is extended or adjusted under 35 U.S.C. 154(b) by 278 days.

(21) Appl. No.: 13/860,970

(22) Filed: Apr. 11, 2013

(65) Prior Publication Data

US 2014/0310641 A1    Oct. 16, 2014

(51) Int. Cl.
G06F 13/00    (2006.01)
G06F 15/00    (2006.01)
G06F 3/0481    (2013.01)

(52) U.S. Cl.
CPC .................................. G06F 3/0481 (2013.01)

(58) Field of Classification Search
CPC ................................ G06T 17/05; G06T 17/04
USPC .................. 715/763–765, 700, 851–853, 855
See application file for complete search history.

(56) References Cited

U.S. PATENT DOCUMENTS

| | | | | |
|---|---|---|---|---|
| 8,290,942 B2* | 10/2012 | Jones et al. | | 707/723 |
| 8,572,077 B2* | 10/2013 | Dorfman et al. | | 707/729 |
| 8,626,754 B2* | 1/2014 | Jones et al. | | 707/723 |
| 2014/0267257 A1* | 9/2014 | Overbeck et al. | | 345/422 |

* cited by examiner

*Primary Examiner* — Kevin Nguyen
(74) *Attorney, Agent, or Firm* — Dority & Manning, P.A.

(57) ABSTRACT

Systems and methods for management of geographic data layers in a geographic information system are provided. A layer control tool can be presented in conjunction with the geographic imagery. The layer control tool can provide a control interface to allow the user to manage the display of various geographic data layers in conjunction with the geographic imagery. The layer control tool can include a dynamic control list of geographic data layers. Geographic data layers can be identified for inclusion in the dynamic control list and/or ordered within the dynamic control list based on frequency of user interaction with the geographic data layers. In a particular implementation, the geographic data layers are identified for inclusion in the dynamic control list and/or ordered within the dynamic control list based on a layer score associated with each geographic data layer.

20 Claims, 6 Drawing Sheets

US 9,164,651 B2

MANAGEMENT OF GEOGRAPHIC DATA LAYERS IN A GEOGRAPHIC INFORMATION SYSTEM

FIELD

The present disclosure relates generally to geographic information systems and more particularly to managing geographic data layers in a geographic information system.

BACKGROUND

Geographic information systems provide for the archiving, retrieving, and manipulating of data that has been stored and indexed according to geographic coordinates of its elements. Interactive geographic information systems allow for the navigating and displaying of geographic imagery. Some interactive geographic information systems provide a user interface with navigation controls for navigating cities, neighborhoods, geographic areas and other terrain in two or three dimensions.

Geographic information systems can display many different layers of information on top of a two or three dimensional representation of the world. These geographic data layers can include, for instance, terrain data layers, street information data layers, building data layers, border data layers, and other geographic data layers that provide information associated with discrete geographic coordinates. Due to the high volume of available geographic data layers in some geographic information systems, the browsing, selection and control of the geographic data layers can be difficult and cumbersome for a user. This can be particularly true in mobile device applications where display space may be limited.

SUMMARY

Aspects and advantages of the invention will be set forth in part in the following description, or may be obvious from the description, or may be learned through practice of the invention.

One exemplary aspect of the present disclosure is directed to a computer-implemented method of managing geographic data layers in a geographic information system for displaying geographic imagery. The method includes initiating a current geographic information system session and identifying, with a computing device, a plurality of geographic data layers for inclusion in a dynamic control list of geographic data layers. The method further includes determining, with the computing device, a presentation order for the plurality of geographic data layers in the dynamic control list based at least in part on a layer score associated with each of the plurality of geographic data layers. The layer score is indicative of frequency of user interaction with the geographic data layer. The method further includes presenting a layer control tool in a user interface on a display device. The layer control tool provides a control interface for the plurality of geographic data layers in the dynamic control list. The layer control tool presents the plurality of geographic data layers in the dynamic control list according to the presentation order.

Other exemplary aspects of the present disclosure are directed to systems, apparatus, non-transitory computer-readable media, user interfaces and devices for managing geographic data layers in a geographic information system.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
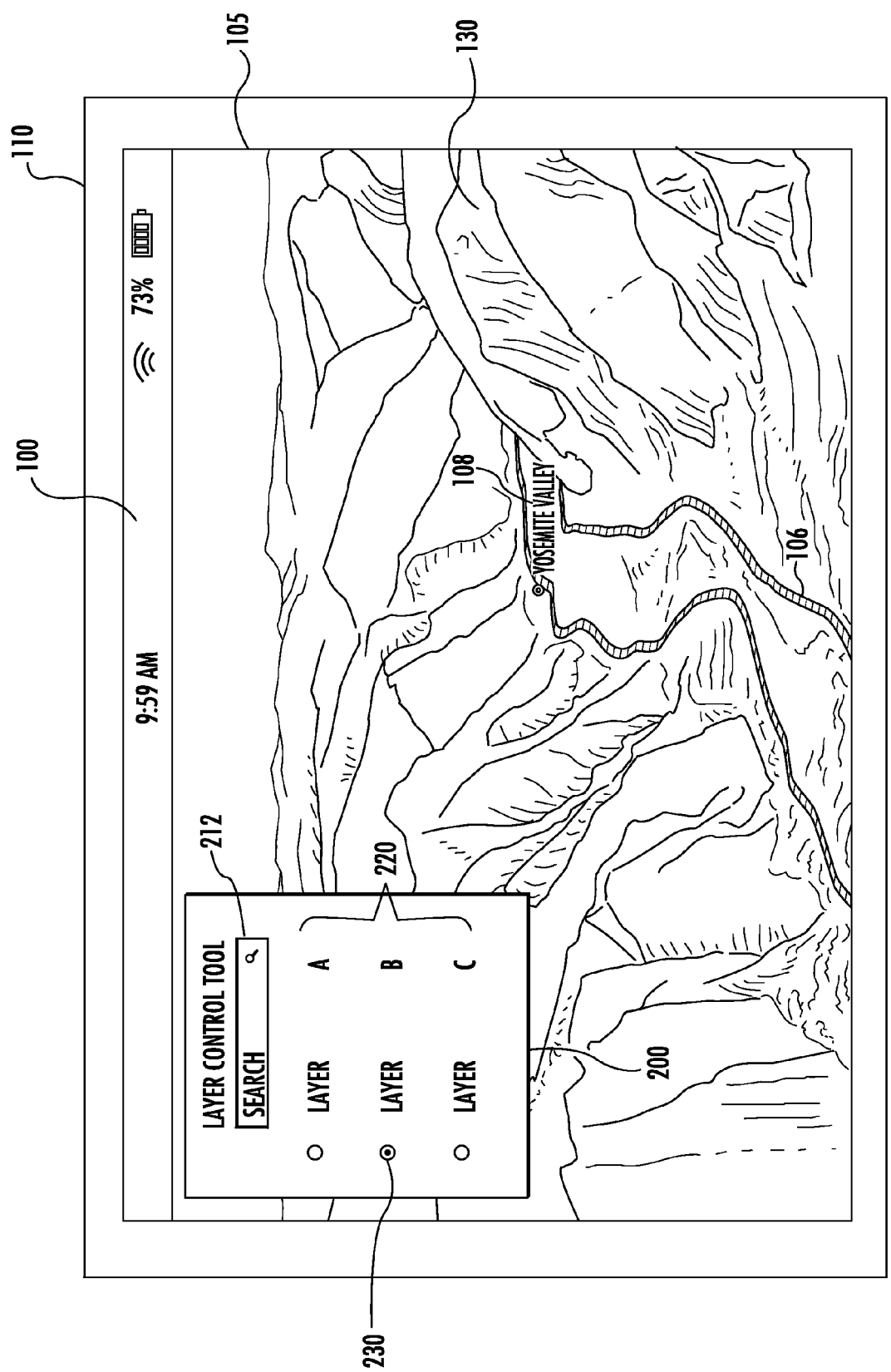
FIG. 1 depicts an exemplary user interface for a geographic information system according to an exemplary embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to the management of geographic data layers in a geographic information system. The geographic information system can be configured to present geographic imagery, such as map imagery, satellite imagery, three-dimensional geographic imagery, or other imagery associated with a geographic area, to a user during a geographic information system session. A geographic information system session refers to a discrete period of user activity with the geographic information system. For instance, a geographic information system session can be initiated when a user starts up or logs in to an application or program providing the user access to the geographic information system and can be terminated when the user shuts down, closes, or logs out from the application or program providing the user access to the geographic information system. Once the geographic information system session has been initiated, a layer control tool can be presented in conjunction with the geographic imagery.

The layer control tool can provide a control interface to allow the user to manage the display of various geographic data layers in conjunction with the geographic imagery. The layer control tool can be presented floating over the geographic imagery to facilitate user access to the layer control tool. The layer control tool can include a dynamic control list of geographic data layers. The dynamic control list can include recently used geographic data layers from previous geographic information system sessions. A user can control the display of geographic data layers included in the dynamic control list by interacting with the layer control tool. For instance, the user can toggle the display of the geographic data layer by interacting with the layer control tool (e.g. by clicking or tapping the layer control tool) to adjust the status of the geographic data layer between a displayed state and a non-displayed state. A geographic data layer has a displayed state if the geographic data layer is currently displayed in conjunction with the geographic imagery. A geographic data layer has a non-displayed state if the geographic data layer is currently not displayed in conjunction with the geographic imagery.

According to exemplary aspects of the present disclosure, geographic data layers can be identified for inclusion in the dynamic control list and/or ordered within the dynamic control list based on frequency of user interaction with the geographic data layers. For instance, a geographic data layer with which a user frequently interacts can be presented in the layer control tool towards the top of the dynamic control list so that it is readily accessible by the user. A geographic data layer with which a user rarely interacts can be presented towards the bottom of the dynamic control list or excluded from the dynamic control list altogether. In this way, the dynamic control list can provide a changing list of geographic data layers that is automatically updated based on user interaction with the different geographic data layers. Moreover, because the layer control tool can provide a control interface only for those geographic data layers that are frequently used by the user, the layer control tool can take up less screen space. This can be particularly useful in mobile device applications where display screen space can be limited.

In a particular implementation, the geographic data layers are identified for inclusion in the dynamic control list and ordered within the dynamic control list based on a layer score associated with each geographic data layer. The layer score of a geographic data layer can be indicative of frequency of user interaction with the geographic data layer. The ordering of the geographic data layers can be based on the layer scores for the plurality of geographic data layers calculated during a previous geographic information system session so that the ordering of the layers in the dynamic control list is not affected by user interaction during the current geographic information system session. Alternatively, the presentation order of the geographic data layers in dynamic control list can be updated based on the layer scores every time the layer control tool is hidden from and brought back into view in the user interface to prevent the layer control tool interface from changing while the user is currently interacting with the layer control tool.

In one example, the layer score can be a zero or positive integer value that is assigned to the geographic data layer. The layer score for each geographic data layer can be calculated during a particular geographic information system according to a ranking algorithm. The ranking algorithm can include: (1) initializing the layer score for each geographic data layer, for instance, to zero or to the layer score for the geographic data layer calculated during the previous geographic information system session; (2) decreasing the layer score for each geographic data layer by a first point value upon initiation of the geographic information system session (with zero as the lower limit for the layer score); (3) increasing the layer score for each geographic data layer having a default displayed state by a second point value upon initiation of the geographic information system session; and (4) increasing the layer score by a third point value for each geographic data layer toggled to a displayed state at least once during the geographic information system session.

FIG. 1 depicts an exemplary user interface 100 that includes a layer control tool 200 for managing geographic data layers. The user interface 100 can be provided by a geographic information system that allows a user to navigate geographic imagery, such as the Google Maps™ or Google Earth™ geographic information systems provided by Google Inc. The user interface 100 can be presented on a display 105 of a computing device 110, such as a smartphone, tablet, mobile phone, mobile device, desktop, laptop, or other suitable computing device.

The user interface 100 presents geographic imagery 130. The geographic imagery 130 can be two or three dimensional imagery of a geographic area of interest. In one example, the geographic imagery can be provided as part of a three dimensional model, such as part of a three dimensional model of the Earth. The user can navigate the geographic imagery 130 by navigating a virtual camera using various control tools or using various other user interactions, such as touch interactions on the display 105. For instance, a user can interact with the user interface 100 to pan, tilt, and zoom the geographic imagery 130.

Geographic data layers can be presented in conjunction with the geographic imagery 130. The geographic data layers provide information associated with discrete geographic coordinates for display in conjunction with the geographic imagery. Geographic data layers typically present graphical elements in conjunction with the geographic imagery at discrete geographic locations. Exemplary geographic data layers depicted in FIG. 1 include a street information geographic data layer 106 and a labels geographic data layer 108. The street information geographic data layer 106 can provide information such as the location and names of streets depicted in the geographic imagery 130. The labels geographic data 108 can provide information associated with geographic areas and/or objects depicted in the geographic imagery 130. Other suitable geographic data layers can be presented in conjunction with the geographic imagery without deviating from the scope of the present disclosure.

The geographic information system can include many different available geographic data layers for presentation in conjunction with the geographic imagery. The geographic data layers can be available from a variety of different sources and/or stored across a plurality of different databases. To manage the presentation of the geographic data layers, the user interface 100 can present a floating layer control tool 200 in conjunction with the geographic imagery 130. The floating layer control tool 200 is presenting floating over the geographic imagery 130 such that it is readily accessible by a user. The layer control tool 200 allows a user to quickly control which geographic data layers are presented in conjunction with the geographic imagery 130 so that a user can quickly view and compare geographic data layers in the geographic information system.

The layer control tool 200 can be presented anywhere in the user interface in conjunction with the geographic imagery 130. A user can manipulate the location of the layer control tool 200 relative to the geographic imagery 130, for instance, by selecting and dragging (e.g. with a finger swipe) the layer control tool 200 to different locations. In certain implementations, the layer control tool 200 can be hidden off screen. A user can request display of the layer control tool 200, for instance, by interacting with an icon or other graphic associated with the layer control tool 200. A user can hide the layer control tool 200, for instance, by dragging the layer control tool 200 off screen using a touch interaction such as a finger swipe. Other suitable user interactions can be used to display and hide the layer control tool 200 without deviating from the scope of the present disclosure.

The layer control tool 200 can include a search tool 212. The search tool 212 can be configured to search various sources/databases of available geographic data layers in the geographic information system. For instance, a user can type in a few characters and geographic data layers matching the query can be presented to the user. The user can select different geographic data layers responsive to the query for display in conjunction with geographic imagery. The search tool 212 can allow the user to easily locate particular geographic data layers out of the many dozens or hundreds of geographic data layers that may be available in the geographic information system.

The layer control tool 200 can further include a dynamic control list 220 of geographic data layers. The dynamic control list 220 can be dynamic and can be populated based on frequency of user access/interaction with the geographic data layers. The dynamic control list 220 of the layer control tool 200 of FIG. 1 includes three geographic data layers for purposes of illustration and discussion: (1) Layer A; (2) Layer B; and (3) Layer C. More or fewer geographic data layers can be included in the dynamic control list without deviating from the scope of the present disclosure.

The layer control tool 200 can provide a control interface for the geographic data layers included in the dynamic control list 220. For instance, a user can toggle the display of geographic data layers in the dynamic control list 220 by interacting with the layer control tool. Responsive to the user interaction, the geographic information system can display or hide geographic data layers. For instance, a user can select Layer B by interacting with the layer control tool 200 (e.g. clicking or tapping Layer B). Layer B can be toggled from a non-displayed state to a displayed state in response to the user interaction. The layer control tool 200 can include indicia 230 indicative of whether a particular geographic data layer in the dynamic control list 200 is in a displayed state or in a non-displayed state. Any suitable indicia can be used without deviating from the scope of the present disclosure.

Figure 2:
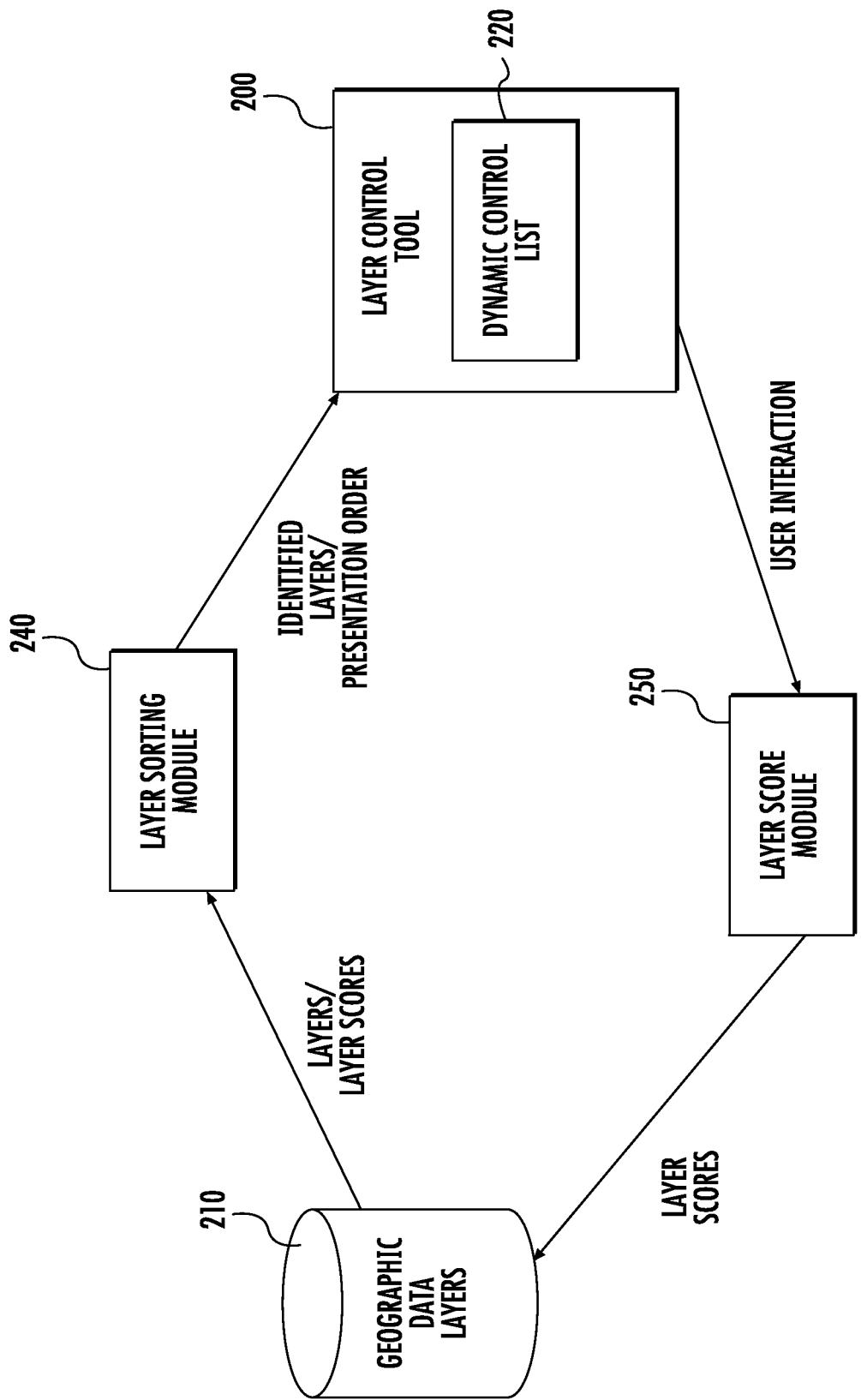
FIG. 2 depicts a block diagram illustrating the exemplary management of geographic data layers in a geographic information system according to an exemplary embodiment of the present disclosure.

According to aspects of the present disclosure, geographic data layers are identified for inclusion in the dynamic control list 220 and ordered within the dynamic control list 220 based on frequency of user access/interaction with the geographic data layers. FIG. 2 depicts an overview of the exemplary management of the dynamic control list 220 in the layer control tool 200 according to an exemplary embodiment of the present disclosure. In particular, a layer sorting module 240 can access a plurality of available geographic data layers 210 for the geographic information system. The layer sorting module 240 can identify geographic data layers for inclusion in the dynamic control list 220 and/or can determine a presentation order for the dynamic control list 220, for instance, based on layers scores associated with the geographic data layers. A layer score module 250 can update layer scores for the geographic data layers based on user interaction with the geographic data layers.

More particularly, the geographic information system can include a plurality of available geographic data layers 210. The plurality of available geographic data layers 210 can be available from one or more sources/databases associated with the geographic information system. Each of the plurality of available geographic data layers 210 can have a layer score indicative of the frequency of user interaction with the geographic data layer.

The layer sorting module 240 can identify geographic data layers for inclusion in the dynamic control list 220 of the layer control tool 200 based at least in part the layer scores associated with the available geographic data layers 210. For instance, the layer sorting module 240 can identify the geographic data layers with the highest layer scores to be included in the dynamic control list 220.

The layer sorting module 240 can also identify geographic data layers for inclusion in the dynamic control list 220 based on other factors. For instance, the layer sorting module 240 can automatically identify geographic data layers having a default displayed state for inclusion in the dynamic control list 220. A geographic data layer having a default displayed state can be a geographic data layer that is automatically displayed in conjunction with the geographic imagery during initiation of a geographic information system session. A geographic data layer can have a default displayed state if the geographic data layer had a displayed state when the previous geographic information system session was terminated. Alternatively or in addition, a geographic data layer can have default displayed state based on user settings/preferences associated with the geographic information system.

The layer sorting module 240 can also be configured to add any geographic data layers that are displayed during the current geographic information system session to the dynamic control list 220. For instance, if a user displays a new geographic data layer during the current geographic information system that is not included in the dynamic control list 220, the layer sorting module 240 can add the new geographic data layer to the dynamic control list 220. The new geographic data layer can be presented towards the bottom of the dynamic control list 220 so as not to affect the presentation order of the existing geographic data layers in the dynamic control list 220.

The layer sorting module 240 can also be configured to determine a presentation order for the plurality of geographic data layers identified for inclusion in the dynamic control list 220 based on the layer scores associated with the available geographic data layers. In one implementation, the layer sorting module 240 determines the presentation order based on layer scores associated with a previous geographic information system session so that user interaction with the geographic data layers during the current geographic information system session does not affect the presentation order of the dynamic control list 220. In another implementation, the layer sorting module 240 updates the presentation order for the dynamic control list 220 based on layer scores associated with the geographic data layers every time the layer control tool 200 is hidden from view.

As discussed above, the layer control tool 200 provides a control interface for the geographic data layers in the dynamic control list 220. A user can toggle the display of geographic data layers by interacting with the layer control tool 200. The frequency of user interaction with the geographic data layers of the geographic information system can be used to update the layers scores associated with the geographic data layers.

In particular, the layer score module 250 can update the layer scores for the plurality of geographic data layers based on user interaction with the geographic data layers in the geographic information system. The layer score module 250 can update the layers scores according to any suitable ranking algorithm. An exemplary ranking algorithm will be discussed with reference to FIG. 4 below. The updated layer scores can be used by the layer sorting module 240 to update the dynamic control list 220 so that the dynamic control list 220 provides a control interface for geographic data layers most likely to be used by the user.

Figure 3:
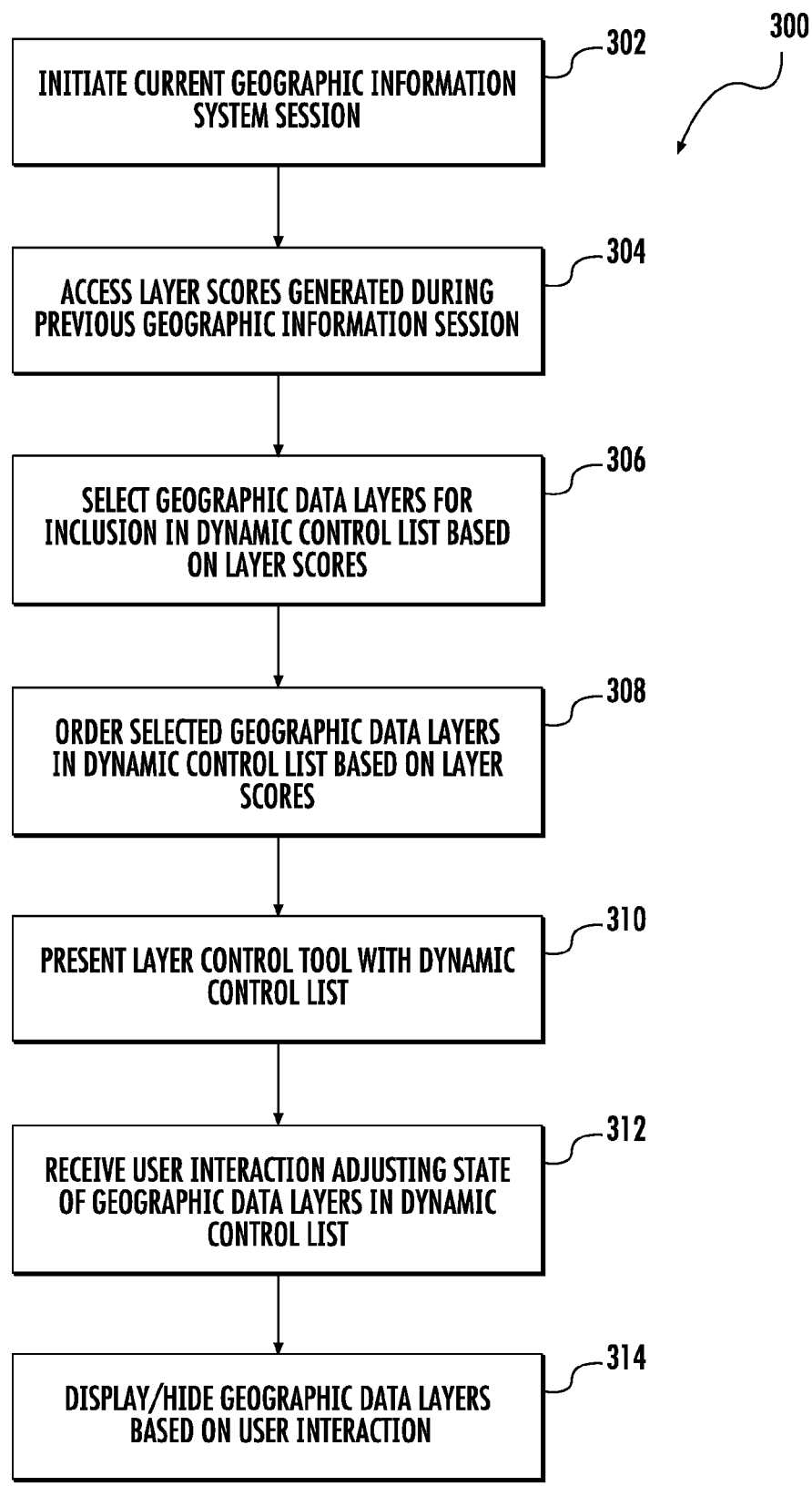
FIG. 3 depicts a flow diagram of an exemplary method for managing geographic data layers in a geographic information system according to an exemplary embodiment of the present disclosure.

FIG. 3 depicts a flow diagram of an exemplary method (300) for managing geographic data layers according to an exemplary embodiment of the present disclosure. FIG. 3 can be implemented using any suitable computing environment, such as the computing system depicted in FIG. 8. In addition, FIG. 3 depicts steps performed in a particular order for purposes of illustration and discussion. Those of ordinary skill in the art, using the disclosures provided herein, will understand that various steps of the methods discussed herein can be omitted, rearranged, combined and/or adapted in various ways.

At (302), the method includes initiating a current geographic information system session. A user can initiate a current geographic information system session by starting up or logging in to an application or program that provides a user access to the geographic information system. For instance, in one example, a geographic information system session can be initiated when a user opens or logs in to an application associated with the geographic information system on a computing device accessible by the user.

Layer scores associated with a plurality of geographic data layers generated during a previous geographic information system session are accessed at (304). The layer score for a geographic data layer is indicative of the frequency of user interaction with the geographic data layer. For instance, a geographic data layer that is frequently displayed can have a higher layer score than a geographic data layer that is rarely displayed. The layer scores can be generated using a suitable ranking algorithm.

Figure 4:
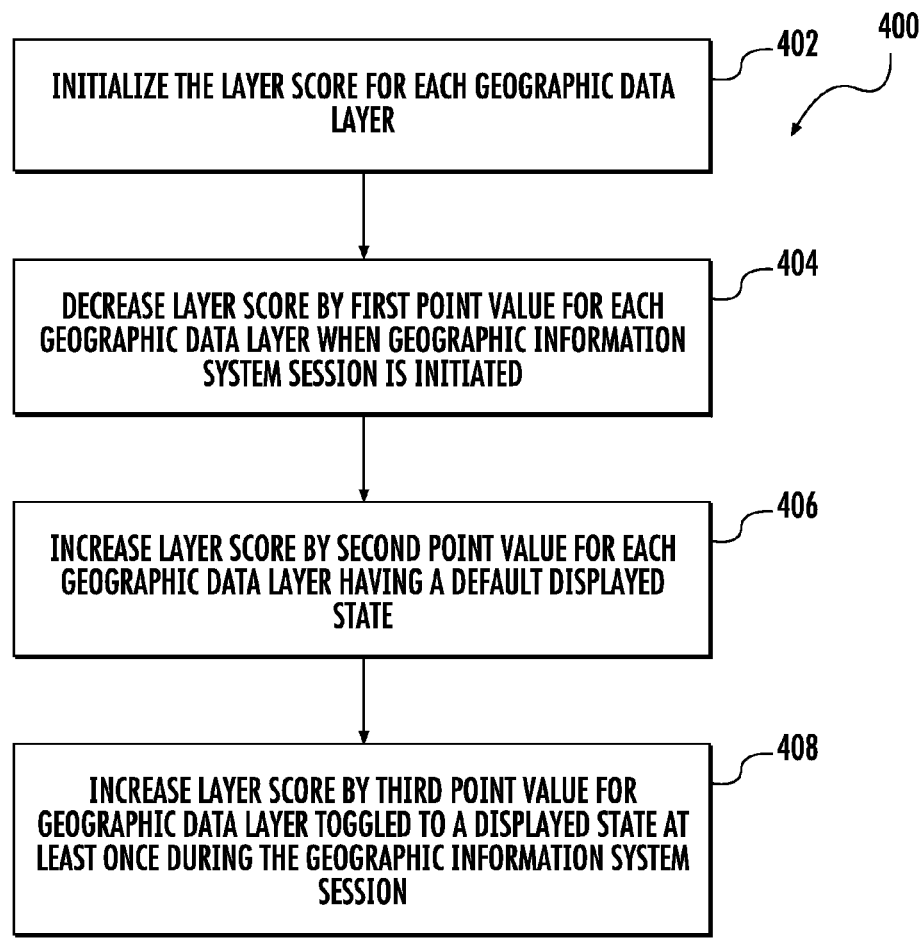
FIG. 4 depicts a flow diagram of an exemplary ranking algorithm according to an exemplary embodiment of the present disclosure.

FIG. 4 depicts a flow diagram of an exemplary ranking algorithm (400) that can be used to generate layer scores for a plurality of geographic data layers during a geographic information system session. The exemplary ranking algorithm (400) computes zero or positive integer layer scores for each geographic data layer.

In particular at (402), the ranking algorithm initializes the layer score for each geographic data layer for the geographic information system session. If the geographic data layer has never been used or accessed, the layer score for the geographic data layer can be initialized to a zero. If the layer score has been previously used or accessed, the layer score can be initialized to the layer score of the geographic data layer at the termination of the previous geographic information system session. For instance, if the layer score for a particular geographic data layer is 1 at the termination of the previous geographic information system session, the layer score for the particular geographic data layer can be initialized to 1.

At (404), the ranking algorithm decreases the layer score by a first point value for each geographic data layer when the geographic information system session is initiated. This portion of the ranking algorithm provides for the decay of layer scores of geographic data layers over time. The first point value can be set to any suitable value depending on the how fast the layers scores are to decay. For instance, in one example, the first point value can be equal to 1. The ranking algorithm can be configured such that a layer score for a particular geographic data layer is not decreased below zero.

At (406), the ranking algorithm increases the layer score by a second point value for each geographic data layer having a default displayed state when the geographic information system session is initiated. As discussed above, a geographic data layer having a default displayed state is automatically displayed when the geographic information system session is initiated. The second point value can be set to any suitable value. In one example, the second point value can be equal to the first point value so that geographic data layers having a default displayed state are not subject to the decay of layer scores provided by the ranking algorithm. For instance, the second point value can be equal to 1.

At (408), the ranking algorithm increases the layer score by a third point value for each geographic data layer toggled to a displayed state at least once during the geographic information system session. In particular, a layer score for a geographic data layer can be increased by the third point value if the status of the geographic data layer is changed from a non-displayed state to a displayed state during the geographic information system session. In one implementation, the layer score can be increased by the third point value only the first time the geographic data layer is toggled to the displayed state during the geographic information system session. Alternatively, the layer score for a geographic data layer can be increased by the third point value each time the geographic data layer is toggled to the displayed state during the geographic information system session. The third point value can be set to any suitable value. In one example, the third point value can be equal to the first point value and/or the second point value. For instance, the third point value can be equal to 1.

Referring back to FIG. 3 at (306), geographic data layers are identified for inclusion in a dynamic control list of a layer control tool based on the layer scores associated with the geographic data layers. For instance, the geographic data layers having the highest layer scores can be selected for inclusion in the dynamic control list. At (308), the geographic data layers are ordered within the dynamic control list based at least in part on the layer scores associated with geographic data layers. In particular, a presentation order for the geographic data layers can be determined that ranks the geographic data layers identified for inclusion in the dynamic control list from highest layer score to lowest layer score. Geographic data layers with equal layer scores can be ordered alphabetically or pursuant to another suitable scheme.

At (310), the layer control tool including the dynamic control list is presented in a user interface on a display of a computing device. The dynamic control list includes the geographic data layers identified for inclusion in the dynamic control list. In addition, the geographic data layers are ordered within the dynamic control list based on the presentation order determined from the layer scores associated with the geographic data layers. An exemplary layer control tool 200 including a dynamic control list 220 is depicted in FIG. 1.

The layer control tool provides a control interface for the geographic data layers in the dynamic control list. At (312) of FIG. 3, the method can include receiving a user interaction adjusting the state of one or more geographic data layers in the dynamic control list. For instance, a user can interact with a particular geographic data layer in dynamic control list by clicking, tapping, or performing some other suitable interaction with the particular geographic data layer. In response to the user interaction, the status of geographic data layer can be changed or toggled between a displayed state and a non-displayed state. For instance, as shown at (314) of FIG. 3, the geographic data layers can be displayed or hidden based on the user interaction with the layer control tool.

Figure 5:
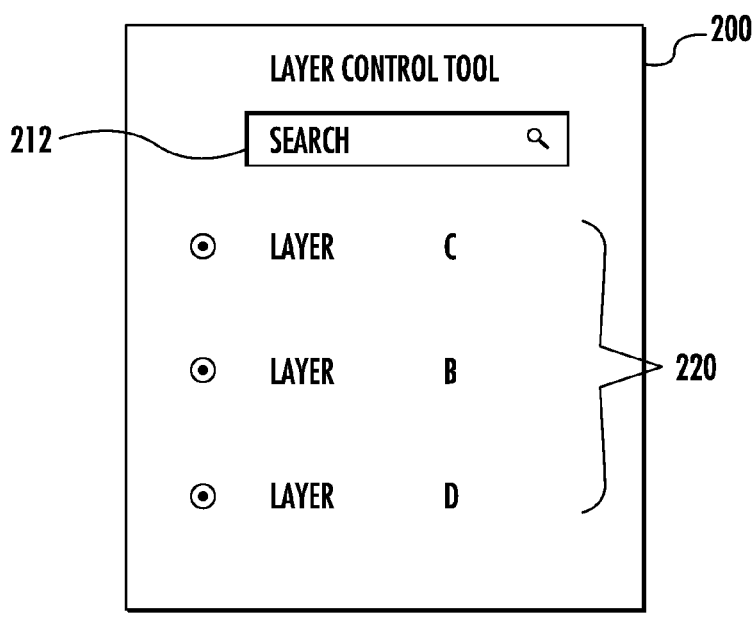
FIGS. 5-7 depict the exemplary management of geographic data layers in a dynamic control list of a layer control tool according to an exemplary embodiment of the present disclosure.
Figure 6:
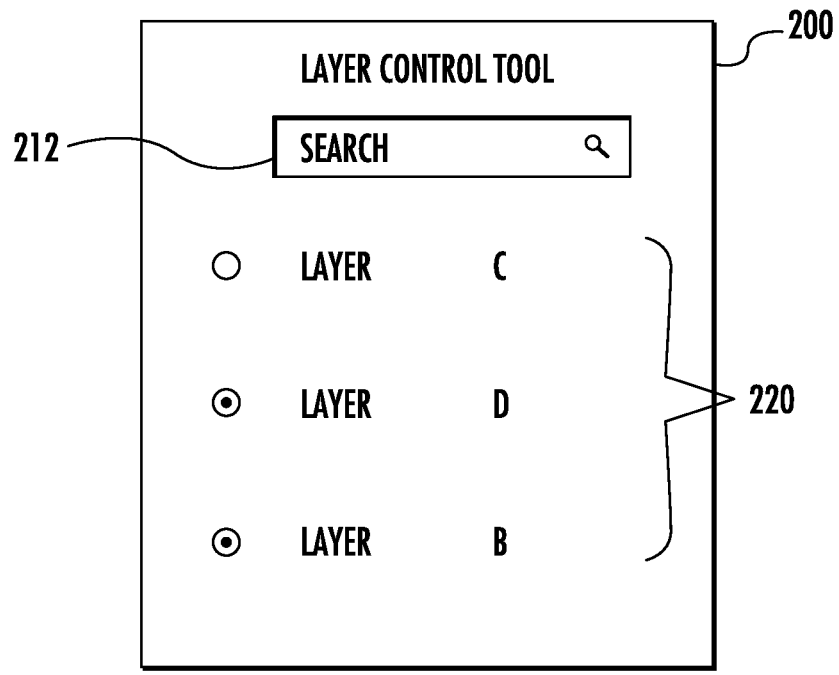
Figure 7:
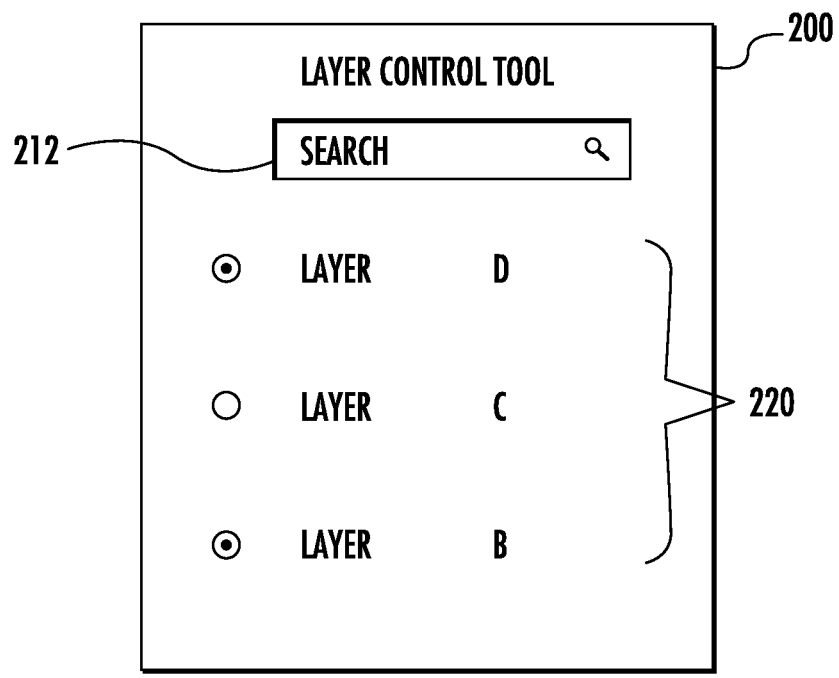

With reference now to FIGS. 5-7, an example illustrating management of geographic data layers in a dynamic control list 220 presented in a layer control tool 200 according to an exemplary embodiment of the present disclosure will now be set forth. This example will be discussed with reference to four available geographic data layers: (1) Layer A; (2) Layer B; (3) Layer C; and (4) Layer D. The dynamic control list can present three geographic data layers. The initial layer score for each of Layer A, Layer B, Layer C, and Layer D can be zero. The initial presentation order of the geographic data layers can be the presentation order set forth in the dynamic control list 220 of FIG. 1: (1) Layer A; (2) Layer B; and (3) Layer C.

User interaction with the geographic data layers in a first geographic information system session (Session 1) is set forth below:

Session 1:
Layer A has a default non-displayed state and is never toggled to a displayed state;
Layer B has a default displayed state but was never toggled to a displayed state;
Layer C has a default displayed state and was toggled to a displayed state at least once;
Layer D has a default non-displayed state and was toggled to a displayed state at least once.

According to the exemplary ranking algorithm depicted in FIG. 4, layer scores for the geographic data layers can be computed as follows. The layer score of each layer is initialized to zero. The layers scores are not decreased below zero upon initiation of Session 1. The layer scores of Layer B and Layer C are increased by 1 at the initiation of Session 1 for having a default displayed state. The layer scores of Layer C and Layer D are increased by 1 for being toggled to a displayed state during the geographic information system session. The ranking scores at the termination of Session 1 are as follows:

Layer A—0;
Layer B—1;
Layer C—2; and
Layer D—1.

Upon initiation of the next geographic information system session (Session 2), the geographic data layers can be selected and ordered in the layer control tool 200 as shown in FIG. 5. In particular, the presentation order for the dynamic control list 220 of the layer control tool 200 is: (1) Layer C; (2) Layer B; and (3) Layer D.

User interaction with the geographic data layers during a second geographic information system session (Session 2) is set forth below:

Session 2:
Layer A has a default non-displayed state and is never toggled to a displayed state;
Layer B has a default displayed state but was never toggled to a displayed state;
Layer C has a default displayed state and was toggled to a displayed state at least once. The session is terminated with Layer C turned off
Layer D has a default displayed state and was toggled to a displayed state at least once. The session is terminated with Layer D turned on.

According to the exemplary ranking algorithm depicted in FIG. 4, layer scores for the geographic data layers can be computed as follows. The layer score of each layer is initialized to the layer score at the termination of Session 1. The layers scores are decreased by 1 at the initiation of Session 2, but are not decreased below zero. The layer scores of Layer B, Layer C, and Layer D are increased by 1 at the initiation of Session 2 for having a default displayed state. The layer scores of Layer C and Layer D are increased by 1 for being toggled to a displayed state during the geographic information system session. The ranking scores at the termination of Session 2 are as follows:

Layer A—0;
Layer B—1;
Layer C—3; and
Layer D—2.

Upon initiation of the next geographic information system session (Session 3), the geographic data layers can be presented in the layer control tool 200 as shown in FIG. 6. In particular, the presentation order for the dynamic control list 220 of the layer control tool 200 is: (1) Layer C; (2) Layer D; and (3) Layer B.

User interaction with the geographic data layers during a second geographic information system session (Session 3) is set forth below:

Session 3:
Layer A has a default non-displayed state and is never toggled to a displayed state;
Layer B has a default displayed state but was never toggled to a displayed state;
Layer C has a default non-displayed state and was never toggled to a displayed state;
Layer D has a default displayed state and was toggled to a displayed state at least once.

According to the exemplary ranking algorithm depicted in FIG. 4, layer scores for the geographic data layers can be computed as follows. The layer score of each layer is initialized to the layer score at the termination of Session 2. The layers scores are decreased by 1 at the initiation of Session 3, but are not decreased below zero. The layer scores of Layer B and Layer D are increased by 1 at the initiation of Session 3 for having a default displayed state. The layer score of Layer D is increased by 1 for being toggled to a displayed state during the geographic information system session. The ranking scores at the termination of Session 3 are as follows:

Layer A—0;
Layer B—1;
Layer C—2; and
Layer D—3.

Upon initiation of the next geographic information system session, the geographic data layers can be presented in the layer control tool 200 as shown in FIG. 7. In particular, the presentation order for the dynamic control list 220 of the layer control tool is 200: (1) Layer D; (2) Layer C; and (3) Layer B.

Figure 8:
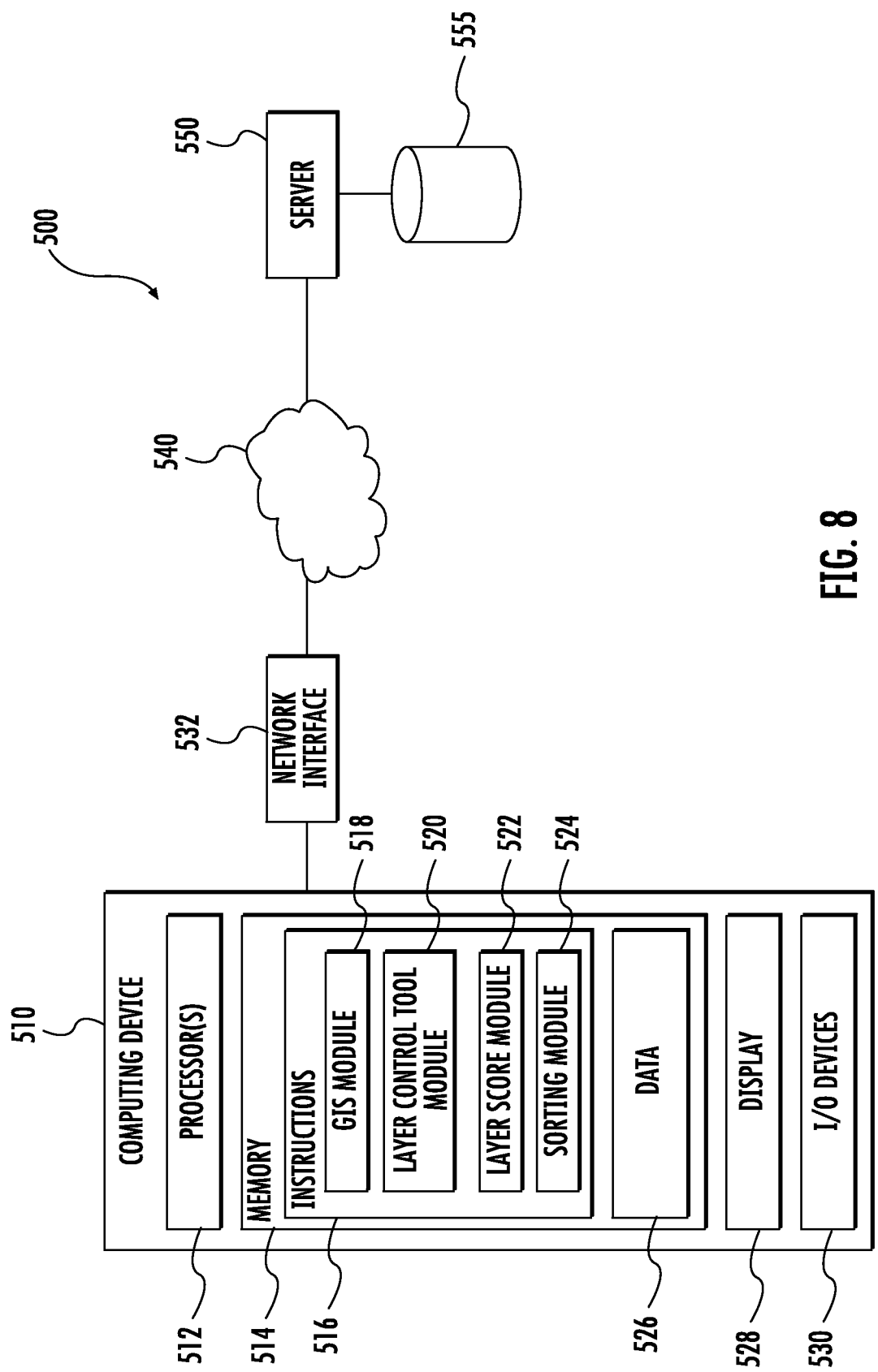
FIG. 8 depicts an exemplary computer-based system according to an exemplary embodiment of the present disclosure.

FIG. 8 depicts an exemplary computing system 500 that can be used to implement the methods and processes for managing geographic data layers in a geographic information system according to exemplary aspects of the present disclosure. The system 500 includes a computing device 510. The computing device 510 can be any machine capable of performing calculations automatically. For instance, the computing device can include a general purpose computer, special purpose computer, laptop, desktop, integrated circuit, or other suitable computing device. In a particular implementation, the computing device 510 can be a mobile device, such as smartphone, tablet, cell phone, or other mobile device capable of being carried by a user. A layer control tool including a dynamic control list generated according to aspects of the present disclosure can be particularly suitable for mobile devices as the layer control tool can provide the ability to quickly control geographic data layers using limited display space.

The computing device 510 can have a processor(s) 512 and a memory 514. The computing device 510 can also include a network interface 532 used to communicate with remote computing devices over a network 540. In one exemplary implementation, the computing device 510 can be in communication with a server 550, such as a web server, used to host a geographic information system, such as the Google Maps™ and/or the Google Earth™ geographic information systems provided by Google Inc.

The processor(s) 512 can be any suitable processing device, such as a microprocessor. The memory 514 can include any suitable computer-readable medium or media, including, but not limited to, non-transitory computer-readable media, RAM, ROM, hard drives, flash drives, magnetic or optical media, or other memory devices. The memory 514 can store information accessible by processor(s) 512, including instructions 516 that can be executed by processor(s) 512. The instructions 516 can be any set of instructions that when executed by the processor(s) 512, cause the processor(s) 512 to provide desired functionality. For instance, the instructions 516 can be executed by the processor(s) 512 to implement a geographic information system (GIS) module 518. The GIS module 518 can allow a user of the computing device 510 to interact with a geographic information system hosted by, for instance, the server 550.

The GIS module 518 can include, among other components, a renderer module and a navigation module. The navigation module can receive user input regarding a desired view in the geographic information system and uses the user input to construct a view specification for a virtual camera. The renderer module uses the view specification to determine what data to draw and draws the data. If the renderer module needs to draw data that the computing device 510 does not have, the renderer module can send a request to the server 550 for the data over the network 540.

The computing device 510 can further include instructions 516 to implement a layer control tool module 520, a layer score module 522, and a sorting module 524. The layer control tool module 520 can present a layer control tool in conjunction with geographic imagery that provides a control interface for a dynamic control list of geographic data layers. The layer score module 522 can compute layer scores for a plurality of geographic data layers according to any of the techniques discussed herein, such as according to the ranking algorithm of FIG. 4. The layer sorting module 240 can identify geographic data layers for inclusion in the dynamic control list 220 and/or can determine a presentation order for the dynamic control list 220, for instance, based on the layers scores associated with the geographic data layers.

It will be appreciated that the term "module" refers to computer logic utilized to provide desired functionality. Thus, a module can be implemented in hardware, application specific circuits, firmware and/or software controlling a general purpose processor. In one embodiment, the modules are program code files stored on the storage device, loaded into memory and executed by a processor or can be provided from computer program products, for example computer executable instructions, that are stored in a tangible computer-readable storage medium such as RAM, hard disk or optical or magnetic media. For instance, the GIS module 518, layer control tool module 520, layer score module 522, and sorting module 524 can be implemented using HTML, XML, Java, Flash, or other suitable platform.

Memory 514 can also include data 526 that can be retrieved, manipulated, created, or stored by processor(s) 512. For instance, memory 514 can store geographic data, geographic imagery, geographic data layers, layer scores and other information that is used by geographic information system. Processor(s) 512 can use this data to present geographic information including geographic imagery and one or more geographic data layers to a user.

Computing device 510 can include or can be coupled to one or more input/output devices 530. Input devices may correspond to one or more peripheral devices configured to allow a user to interact with the computing device 510. One exemplary input device can be a touch interface (e.g. a touch screen or touchpad) that allows a user to interact with the geographic information system using touch commands. Output device can correspond to a device used to provide information to a user. One exemplary output device includes a display 528 for presenting the user interface, including the layer control tool, to allow a user to interact with the geographic information system. The computing device 510 can include or be coupled to other input/output devices 530, such as a keyboard, microphone, mouse, audio system, printer, and/or other suitable input/output devices.

The server 550 can host the geographic information system. The server 550 can be configured to exchange data with the computing device 510 over the network 540. For instance, responsive to a request for information, the server 550 can encode data in one or more data files and provide the data files to the computing device 510 over the network 540. Similar to the computing device 510, the server 550 can include a processor(s) and a memory. The server 550 can also include or be in communication with one or more databases 555. Database(s) 555 can be connected to the server 550 by a high bandwidth LAN or WAN, or can also be connected to server 550 through network 540. The database 555 can be split up so that it is located in multiple locales.

The network 540 can be any type of communications network, such as a local area network (e.g. intranet), wide area network (e.g. Internet), or some combination thereof. The network 540 can also include a direct connection between a computing device 510 and the server 550. In general, communication between the server 550 and a computing device 510 can be carried via a network interface 532 using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of managing geographic data layers in a geographic information system for displaying geographic imagery, comprising:

initiating, by one or more computing devices, a current geographic information system session; wherein the one or more computing devices comprise one or more processors;

identifying, by the one or more computing devices, a plurality of geographic data layers for inclusion in a dynamic control list of geographic data layers;

determining, by the one or more computing devices, a presentation order for the plurality of geographic data layers in the dynamic control list based at least in part on a layer score associated with each of the plurality of geographic data layers, the presentation order ordering the geographic data layers in the dynamic control list, the layer score indicative of frequency of user interaction with the geographic data layer; and presenting, by the one or more computing devices, a layer control tool in a user interface on a display device, the layer control tool providing a control interface for toggling the display of the plurality of geographic data layers in the dynamic control list, the layer control tool presenting the plurality of geographic data layers in the dynamic control list according to the presentation order.

2. The computer-implemented method of claim 1, wherein the layer score for each geographic data layer is generated during a geographic information system session according to a ranking algorithm.

3. The computer-implemented method of claim 2, wherein the ranking algorithm comprises:
    initializing, by the one or more computing devices, the layer score for each geographic data layer;
    decreasing, by the one or more computing devices, the layer score for each geographic data layer by a first point value when the geographic information system session is initiated;
    increasing, by the one or more computing devices, the layer score for each geographic data layer having a default displayed state by a second point value when the geographic information system session is initiated; and
    increasing, by the one or more computing devices, the layer score by a third point value for each geographic data layer toggled to a displayed state at least once during the geographic information system session.

4. The computer-implemented method of claim 1, wherein the presentation order is determined based on the layer scores determined for the plurality of geographic data layers during a previous geographic information system session.

5. The computer-implemented method of claim 1, wherein the method comprises updating, by the one or more computing devices, the layer score for each of the plurality of geographic data layers during the current geographic information system session.

6. The computer-implemented method of claim 1, wherein the plurality of geographic data layers are identified for inclusion in the dynamic control list based at least in part on the layer scores determined for the plurality of geographic data layers during a previous geographic information system session.

7. The computer-implemented method of claim 1, wherein the plurality of geographic data layers in the dynamic control list comprise a plurality of recently accessed geographic data layers.

8. The computer-implemented method of claim 1, wherein at least one of the plurality of geographic data layers has a default displayed state.

9. The computer-implemented method of claim 8, wherein a geographic data layer has a default displayed state if the geographic data layer had a displayed state when a previous geographic information system session was terminated.

10. The computer-implemented method of claim 8, wherein identifying, by the one or more computing devices, a plurality of geographic data layers for inclusion in the dynamic control list comprises automatically selecting the at least one geographic data layer having a default displayed state for inclusion in the dynamic control list.

11. The computer-implemented method of claim 1, wherein the method comprises changing, by the one or more computing devices, a status of at least one of the plurality of geographic data layers between a displayed state and a non-displayed state in response to a user interaction with the layer control tool.

12. The computer-implemented method of claim 1, wherein the layer control tool comprises a search tool configured to search a plurality of available geographic data layers for the geographic information system.

13. The computer-implemented method of claim 1, wherein the layer control tool is presented in conjunction with the geographic imagery.

14. A computing system comprising a display and one or more processors, the computing system comprising:
    a layer control tool module implemented by the one or more processors, the layer control tool module configured to present a layer control tool in a user interface on the display in conjunction with geographic imagery, the layer control tool comprising a dynamic control list of a plurality of geographic data layers, the layer control tool providing a control interface for toggling the display of the plurality of geographic data layers, the layer control tool configured to adjust a status of one or more of the plurality of geographic data layers in the dynamic control list between a displayed state and a non-displayed state in response to a user interaction with the layer control tool;
    a layer score module implemented by the one or more processors, the layer score module configured to generate a layer score for each of the plurality of geographic data layers based at least in part on a frequency of user interaction with the geographic data layer; and
    a layer sorting module implemented by the one or more processors, the layer sorting module configured to order the plurality of geographic data layers in the dynamic control list based at least in part on the layer scores determined for the plurality of geographic data layers.

15. The computing system of claim 14, wherein the layer sorting module is configured to identify the plurality of geographic data layers for inclusion in the dynamic control list based at least in part on the layer scores determined for the plurality of geographic data layers.

16. The computing system of claim 14, wherein the layer score module is configured to generate the layer scores for the plurality of geographic data layers during a geographic information system session by performing operations, the operations comprising:
    initializing the layer score for each geographic data layer;
    decreasing the layer score for each geographic data layer by a first point value when the geographic information system session is initiated;
    increasing the layer score for each geographic data layer having a default displayed state by a second point value when the geographic information system session is initiated; and
    increasing the layer score by a third point value for each geographic data layer toggled to a displayed state at least once during the geographic information system session.

17. A computer-implemented method of managing a dynamic control list of geographic data layers in a layer control tool for controlling geographic data layers in a geographic information system, the method comprising:
    initiating, by one or more computing devices, a current geographic information system session;
    accessing, by the one or more computing devices, a layer score generated during a previous geographic information system session indicative of frequency of user interaction for each of a plurality of geographic data layers;
    identifying, by the one or more computing devices, one or more of the plurality of geographic data layers for inclusion in the dynamic control list based at least in part on the layer score generated during the previous geographic information system session for each of the plurality of geographic data layers;
    ordering, by the one or more computing devices, the plurality of geographic data layers identified for inclusion in the dynamic control list based at least in part on the layer score generated during the previous geographic information system session for each of the plurality of geographic data layers; and presenting, by the one or more computing devices, the layer control tool in a user interface on a display device, the layer control tool providing a control interface for toggling the display of the plurality of geographic data layers, the layer control tool being configured to adjust a status of the plurality of geographic data layers in the dynamic control list between a displayed state and a non-displayed state in response to a user interaction with the layer control tool.

18. The method of claim 17, wherein the method comprises updating, by the one or more computing devices, the layer score for each of the plurality of geographic data layers during the current geographic information system session.

19. The method of claim 17, wherein the method comprises:
receiving, by the one or more computing devices, a user interaction directed to the layer control tool; and
adjusting, by the one or more computing devices, the status of one or more of the plurality of geographic data layers between a displayed state and a non-displayed state based at least in part on the user interaction.

20. The method of claim 17, wherein the layer score for each of the plurality of geographic data layers is generated during the previous geographic information system session by performing operations, the operations comprising:
initializing, by the one or more computing devices, the layer score for each geographic data layer;
decreasing, by the one or more computing devices, the layer score for each geographic data layer by a first point value when the previous geographic information system session is initiated;
increasing, by the one or more computing devices, the layer score for each geographic data layer having a default displayed state by a second point value when the previous geographic information system session is initiated; and
increasing, by the one or more computing devices, the layer score by a third point value for each geographic data layer toggled to a displayed state at least once during the previous geographic information system session.

* * * * *